United States Patent [19]

Meisel

[11] 4,232,077
[45] Nov. 4, 1980

[54] HOT-STAMPING FILM, AND PROCESS AND APPARATUS FOR ITS MANUFACTURE

[76] Inventor: Fritz Meisel, Sudweg 60, D-8510 Furth, Bayern, Fed. Rep. of Germany

[21] Appl. No.: 14,025

[22] Filed: Feb. 22, 1979

Related U.S. Application Data

[63] Continuation-in-part of Ser. No. 833,914, Sep. 16, 1977, abandoned.

[51] Int. Cl.³ .......................... B32B 3/00; B44C 1/24; C09J 7/02
[52] U.S. Cl. .................................... 428/174; 156/230; 156/240; 156/247; 427/250; 428/161; 428/187; 428/332; 428/334; 428/339; 428/343; 428/352; 428/914
[58] Field of Search ................. 428/29, 142, 161, 162, 428/174, 352, 353, 332, 334–336, 339, 914, 187; 156/233, 240, 247, 230; 40/160, 616; 427/250, 256, 404, 270, 275

[56] References Cited

U.S. PATENT DOCUMENTS

| 3,510,388 | 5/1970 | Hunt et al. | 428/164 |
| 3,589,962 | 6/1971 | Bonjour | 156/233 |
| 3,953,635 | 4/1976 | Dunning | 428/352 |
| 4,012,552 | 3/1977 | Watts | 156/233 |

Primary Examiner—Paul J. Thibodeau
Attorney, Agent, or Firm—Paul & Paul

[57] ABSTRACT

This invention relates to new hot-stamping films comprising a carrier film, a transparent covering lacquer layer which is provided on its surface facing away from said carrier film, with a spatial pattern, a decorative layer contacting the surface of the transparent covering lacquer layer provided with the spatial pattern, and an adhesive layer, optionally with a separating layer between the carrier film and the covering lacquer layer and optionally with an adhesion-promoter layer between the decorative layer and the adhesive layer, and to a process for their production and to apparatus for the manufacture by this process.

9 Claims, 3 Drawing Figures

HOT-STAMPING FILM, AND PROCESS AND APPARATUS FOR ITS MANUFACTURE

This is a continuation-in-part of my pending application Ser. No. 833,914 filed Sept. 16, 1977, now abandoned.

This invention relates to hot-stamping films, to a process for their manufacture and to apparatus suitable for carrying out this process.

It is frequently desired to provide hot-stamping films with decorative designs. In general this is achieved by carrying out a corresponding imprint. However, by employing this procedure the scope of the design which can be achieved is limited.

It is also already known to achieve decorative effects by roughening the surface of the carrier film adjacent the covering lacquer, for example by brushing or in some other way. This results in the surface of the hot-stamping films appearing matt-finished after the carrier film has been peeled off, after application of the hot-stamping film to the appropriate object. However, it is virtually impossible, or only possible with difficulty, to achieve special decorative effects in addition to the matt-finish in this manner.

Finally, it is already known, particularly in connection with the manufacture of hot-stamping films simulating a wood surface, to provide regions of different gloss on the surface, for example by corresponding printing with matt lacquer. The lacquer producing the matt finish usually remains on the carrier film when the latter is peeled off, during the stamping procedure, from the covering lacquer layer which remains on the object to be decorated. This procedure has the disadvantage that considerable difficulties can arise on printing, unless provision is made in some way for exact matching of the multiple printing, and this requires a correspondingly large expenditure to be successful. Furthermore, the surface of the stamping film is uneven after the carrier film with the lacquer producing the matt finish has been peeled off.

To eliminate the difficulties on printing, proposals have also been made in the past to produce the matt-finished regions by using a special swelling lacquer, so that the register problems can be eliminated. This procedure, however, is disadvantageous because the matt-finish is not sufficiently resistant to mechanical stress. In particular, by polishing the matt-finished regions the desired effect is at least partially destroyed.

It has now been found that a hot-stamping film with novel and characteristic decorative effects can be manufactured without large additional expenditure, care also being taken to ensure that the stamping film is resistant in use, in particular to mechanical actions. This has been achieved by designing a hot-stamping film such that the covering lacquer layer is transparent and is provided with a spatial, i.e. a three-dimensional pattern on its surface facing away from the carrier film.

Accordingly, the present invention provides a hot-stamping film comprising a carrier film, a transparent covering lacquer layer which is provided on its surface facing away from said carrier film, with a spatial pattern, and an adhesive layer, optionally with a separating layer between the carrier film and the covering lacquer layer and optionally with an adhesion-promoter layer between the surface of the lacquer layer provided with a spatial pattern and the adhesive layer.

The invention further provides a process for the manufacture of such hot-stamping films which comprises applying a transparent covering lacquer layer to a carrier film or, if appropriate, to a separating layer which has previously been provided on one face of the carrier film, forming a spatial pattern on the surface of the covering lacquer layer facing away from the carrier film in a stamping operation by means of a roller carrying a complementary pattern, and subsequently applying to the surface of the resultant film provided with the spatial pattern an adhesion promoter, if desired, and an adhesive layer.

The invention also provides apparatus for use in the manufacture of the hot-stamping films of the present invention by the process described above, which comprises a multi-colour printing machine wherein either the second printing roller has been replaced by a calender roller which has an engraved surface and produces a spatial pattern by stamping, or an additional calender roller with an associated pressure device is provided immediately after the first printing roller.

The basic concept of the invention is that the surface of the hot-stamping film, which before stamping is adjacent to the carrier film and is exposed when in use is made smooth so that no mechanical action can have a significant influence on the properties of the film, and instead the unexposed other surface of the covering lacquer layer, which consequently cannot be subjected to such mechanical actions, is provided with a spatial, that is to say three-dimensional, pattern of such a depth that the surface of the stamping film, which as mentioned above is exposed when in use, also appears to be patterned due to the resulting different reflection or refraction of light. The spatial pattern, which can be produced by stamping or calendering, on the inside of the covering lacquer layer can be of any desired design. For example, it is possible to provide a pattern which is known from metal sheets or the like as "engine turn". This pattern comprises regions which are each circular and closely adjacent to one another and which are formed by mutually concentric angular grooves and angular ribs. This gives the impression that the entire surface has been worked point-by-point with a rotary brush. Of course, other types of pattern can also be provided. For example, the spatial pattern on the protected surface of the covering lacquer layer could be an imitation of the grain of wood. In this case, the use of different colours could even be dispensed with under certain circumstances since the different reflection of light also causes differences in brightness.

Particularly interesting optical effects can be achieved when a decorative metal layer of substantially uniform thickness is applied to the surface, carrying the spatial pattern, of the covering lacquer layer. It is preferable for the metal layer to be vapour-deposited. If a metal layer is present, the effect of the reflection at different angles is particularly noticeable.

Another possibility for the manufacture of a stamping film of the present invention is to provide a decorative layer of a pigmented lacquer between the surface carrying the spatial pattern of the transparent covering lacquer layer and the adhesive layer or, if present, the adhesion-promoter layer. Such a procedure would be suitable, for example, for the manufacture of a hot-stamping film which possesses a wood-like pattern.

It has been found that the transparent covering lacquer layer provided with the spatial pattern may have a thickness of from 1.5 to 3μ. The depth of the spatial pattern can then be at least about 1μ. If a metal layer is present, its thickness may be about 500 Å. If a layer of a pigmented lacquer is provided instead of the metal layer, the former may have a thickness of from 2 to 4μ.

The spatial pattern can be applied particularly simply if the transparent covering lacquer layer is formed by a lacquer which is thermoplastic at least during the application of the spatial pattern.

Preferably, the lacquer forming the covering lacquer layer is curable.

The hot-stamping film of the invention preferably is manufactured by adapting a known process for applying the various layers to the carrier film. As described above, in the process of the present invention the transparent covering lacquer layer applied to the carrier film is provided, in a stamping operation, with the desired spatial pattern on its surface, facing away from the carrier film, by means of a roller carrying a complementary pattern. This step is carried out before the adhesive layer and, if appropriate, a further decorative lacquer layer or the adhesion promoter are applied. The stamping operation can be included without difficulty in the conventional process of manufacture of a hot-stamping film, without thereby substantially extending the time required to manufacture the film.

When manufacturing hot-stamping films having a decorative metal layer, it is possible, according to the invention, to proceed by first applying the metal layer—in the customary manner—to the surface of the covering lacquer layer, which faces away from the carrier film and which has not yet been provided with a pattern. Subsequently this surface of the covering lacquer layer, together with the decorative metal layer, is subjected to the stamping operation. Of course, such a procedure is only possible if the metal layer is sufficiently elastic. If this is not the case it is more advantageous if this metal layer is vapour-deposited on the surface of the covering lacquer layer which has already been provided with the the spatial pattern.

To ensure that the spatial pattern of the covering lacquer does not disappear in the course of stamping the hot-stamping film onto the appropriate object, it is advantageous to use a covering lacquer which is selected in such a way that the roller producing the pattern can be heated during the stamping operation to a temperature to at least 150° C., preferably at least 170° C., but below the decomposition temperature of the film.

The spatial pattern can be applied in a particularly simple manner to the carrier film provided with the covering lacquer layer and, if appropriate, the metal layer, in a calender by means of a roller having a correspondingly engraved surface.

The covering lacquer layer and, if appropriate, the pigmented lacquer layer are advantageously applied by screen printing, which in itself is known.

A multiplicity of types of apparatus can conceivably be used for the manufacture of the hot-stamping film of the present invention by the process explained above. In particular, special apparatus for carrying out the stamping operation can be employed. However, from the point of view of manufacturing tehcnology and taking into account the requisite expenditure of time and construction, it is particularly advantageous to employ a multi-colour printing machine in which either the second printing roller has been replaced by a calender roller which has an engraved surface and produces the desired spatial pattern by stamping, or an additional calender roller with an associated pressure device has been included immediately after the first printing roller.

The present invention will now be described, purely by way of example, with reference to the accompanying drawings, in which.

Figure 1:
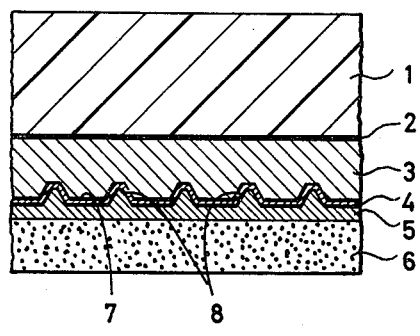
FIG. 1 shows, diagrammatically, a section through a hot-stamping film incorporating a decorative metal layer, the layer thicknesses shown not being to scale.

The hot-stamping film illustrated in FIG. 1 as a working example has the following 6 layers:

1. carrier film (polyester film of from 19 to 23μ thickness,
2. known release layer, approximately 0.1μ thick,
3. thermoplastic or cold crosslinking transparent covering lacquer, approximately 1.5 to 2μ thick,
4. metal layer, vapour-deposited or applied by cathodic evaporation (aluminum, chromium or the like), approximately 500 Å thick,
5. known adhesion promoter, approximately 0.3μ thick, and,
6. known heat-sealing layer or adhesive layer, from 1.5 to 2μ thick.

As can be seen clearly in FIG. 1, the surface of the transparent covering lacquer layer 3 adjacent to the carrier film 1 is smooth, and the surface 7, facing the metal layer 4, of the transparent covering lacquer layer 3 is provided with a spatial pattern 8, represented diagrammatically in the drawing. In the embodiment shown, this pattern 8 is produced by corresponding calendering of the carrier film 1 provided with the covering lacquer layer 3, and is explained further below. After the spatial pattern 8 has been provided on the surface 7 of the covering lacquer layer 3, the metal layer 4 was then applied.

Figure 2:
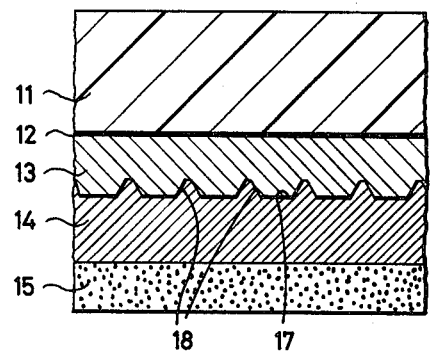
FIG. 2 shows, diagrammatically, a section through a hot-stamping film having a decorative pigmented lacquer layer, the layer thicknesses not being to scale.

The hot-stamping film shown in FIG. 2 possesses a layer of pigmented lacquer in place of the metal layer 4 of the film of FIG. 1. In this way, a different optical effect can be achieved. Due to the presence of the second lacquer layer, the adhesion-promoter layer aiding the attachment of the heat-sealing layer can be dispensed with. In detail, the hot-stamping film of FIG. 2 as a working example has the following layers:

11. carrier film (polyester film of from 19 to 23μ thickness),
12. known release layer, approximately 0.1μ thick,
13. thermoplastic or cold crosslinking, transparent covering lacquer, approximately 1.5 to 2μ thick,
14. pigmented lacquer layer having a thickness of approximately 2.5 to 3μ,
15. known heat-sealing layer or adhesive layer, 1.5 to 2μ thick.

In the hot stamping film of FIG. 2, the surface 17, facing away from the carrier film 11, of the transparent covering lacquer layer 13 is also provided with a spatial pattern 18 which again is only shown very diagrammatically. In the film according to FIG. 2, the pattern 18 can be produced by corresponding calendering of the carrier film 11 with the covering lacquer layer 13.

The following Examples illustrate lacquers which can be used in the manufacture of the hot-stamping films of the present invention. Parts and percentages are by weight.

EXAMPLE 1

The lacquer produced from the constituents listed below is a cold crosslinking lacquer which can be used as a transparent lacquer for the layer 3 of the hot-stamping film of FIG. 1 or for the layer 13 of the hot-stamping film of FIG. 2.

| | |
|---|---|
| Acrylic resin crosslinging with polyisocyanate approximately 60% in xylene/butyl acetate | 41.4 parts |
| polyfunctional, aromatic-aliphatic isocyanate, approximately 60% in ethyl acetate | 12.4 parts |
| nitrocellulose cotton of low viscosity, soluble in esters | 2.8 parts |
| 20% dispersion of polyethylene was in xylene | 4.2 parts |
| matt-finishing agent | 1.3 parts |
| methyl ethyl ketone | 13.8 parts |
| ethyl acetate | 10.3 parts |
| butyl acetate | 13.8 parts |
| | 100.0 parts |
| solids content: 37.1% | |

The lacquer is applied using a No. 40 crossline screen. The dry weight should be at least 2.0 g/m$^2$. Curing takes place at room temperature over approximately 10 days.

EXAMPLE 2

The lacquer whose constituents are listed below is a thermoplastic lacquer which can be employed as a transparent covering lacquer for the layers 3 (FIG. 1) or 13 (FIG. 2).

| | |
|---|---|
| Hard poly-(methyl methacrylate) | 13.8 parts |
| nitrocellulose cotton of low viscosity, soluble in esters | 8.6 parts |
| 20% dispersion of polyethylene wax in xylene | 5.8 parts |
| matt-finishing agent | 1.5 parts |
| ethyl acetate | 30.9 parts |
| toluene | 25.1 parts |
| butyl acetate 98/100% | 14.3 parts |
| | 100.0 parts |
| solids content: 25.1% | |

The lacquer is applied in a No. 40 crossline screen and dried in air. The dry weight should be at least 1.8 g/m$^2$.

EXAMPLE 3

The lacquer of this Example is a pigmented lacquer which can form the layer 14 of the hot-stamping film illustrated in FIG. 2, that is to say it is applied in place of a metal layer. The lacquer can have the following composition:

| | |
|---|---|
| hard poly-(methyl methacrylate), approximately 40% in MEK | 18.3 parts |
| nitrocellulose cotton of low viscosity, soluble in esters | 7.0 parts |
| unsaturated polyester resin | 5.5 parts |
| ketone resin, melting oint 150° | 2.6 parts |
| pigment | 10.0 parts |
| dispersing auxiliary | 0.5 parts |
| pyrogenic silica | 0.7 parts |
| methyl ethyl ketone | 20.5 parts |
| toluene | 15.7 parts |
| butyl acetate 98/100% | 19.2 parts |
| | 100.0 parts |
| solids content: 33.6% | |

The lacquer is applied with a line screen and dried in air. The dry weight should be at least 3 g/m$^2$.

Figure 3:
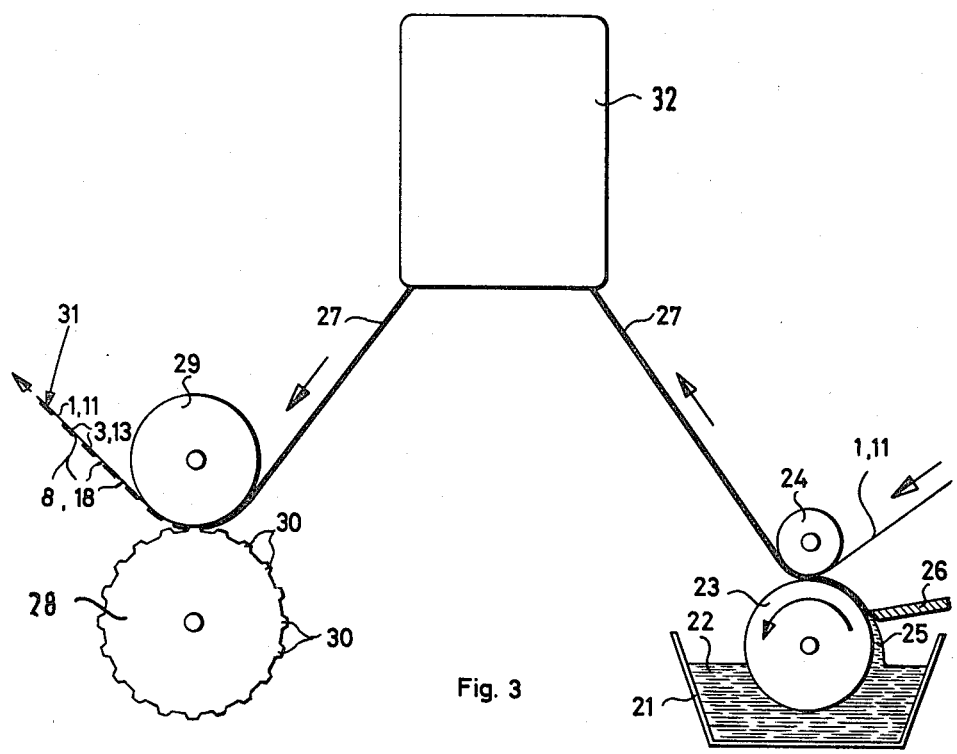
FIG. 3 shows, diagrammatically, the components of the apparatus for applying the covering lacquer layer and the spatial pattern thereto.

Considering now FIG. 3 of the accompanying drawings, this illustrates the essential features of the equipment required to produce the spatial pattern 8 in FIG. 1, or 18 in FIG. 2, on the surface 7 or 17 of the covering lacquer layer 3 or 13. The application of a thermoplastic lacquer as the covering lacquer layer 3 or 13 is taken as the starting point.

In detail, the apparatus illustrated in FIG. 3 comprises a container 21 for thermoplastic lacquer 22. A screen roller 23 which interacts with a rubber pressure device 24 is immersed into the lacquer 22. The lacquer film 25 adhering to the rotating screen roller 23 is restricted to a defined layer thickness required by means of a blade 26.

A carrier film 1 or 11 initially passes between the screen roller 23 and the rubber pressure device 24. Customarily the carrier film 1, 11 has already been provided with the release layer 2, 12.

The transparent covering lacquer 3 or 13 is then applied to the carrier film 1, 11 during its passage through the gap between the screen roller 23 and the pressure device 24. The film 27 lacquered in this way then passes to a dryer 32 in which the lacquer is adequately dried or soldified. The film 27 then passes from the dryer 32 to a further pair of rollers which comprise an engraved roller 28 and an associated rubber pressure device 29. The engraved roller 28 is provided with projections 30 which serve to impress the desired pattern 8, 18 on the surface 7, 17 of the covering lacquer layer 3, 13. For example, the engraved roller is a calender roller which is inserted into a multi-colour printing machine and which can be heated. In general, the roller 28 is heated to a temperature of at least 150° C., preferably about 170° C. This temperature is preferable in order to ensure that, during the actual stamping of the hot-stamping film onto an object, the spatial pattern 8, 18 is not pressed flat due to renewed softening of the transparent covering lacquer layer 3, 13. If this does in fact occur, the consequence would be that the appearance of the hot-stamping film would change when it is applied to the object, since this operation is also carried out at an elevated temperature. The combination 31 of film and covering lacquer, which leaves the pair of rollers 28, 29 and is provided with the spatial pattern, is then processed further in a manner which is customary in the production of hot-stamping films.

If the film shown in FIG. 1 is to be manufactured, the metal layer 4 can subsequently be applied to the combination 31 by vapour-deposition or cathodic evaporation. The metallised film is then provided in a known manner with the adhesion promoter 5 and the adhesive layer or heat-sealing layer 6. If, however, the hot-stamping film illustrated in FIG. 2 is to be produced, the layer 14 of pigmented lacquer is applied to the combination 31 in a further printing process, in a manner similar to that described with reference to FIG. 3 for the application of the covering lacquer layer 3, 13. After adequate curing or drying of the lacquer layer 14, an adhesive layer or heat-sealing layer 15 is then also applied in this case.

To attach the hot-stamping films of the present invention to a suitable object, the hot-stamping layers having the adhesive layer or heat-sealing layer 6, 15 are placed onto the object and pressed on under the action of heat. As a result, the part of the hot-stamping films, formed by the layers 3 to 6 or 13 to 15, then adheres to the surface of the object. Due to the presence of the release layer 2, 12, the carrier film 1 or 11 can then be detached.

The detachment is facilitated by the fact that the release layer 2 or 12, which can, for example, be a wax layer, melts on warming.

Although described above that the metal layer can be applied to the combination 31 of FIG. 3, that is to say after the spatial pattern has been applied, it would of course also be possible first to metallise the film with the covering lacquer layer (27 in FIG. 3) and then to subject it to the stamping operation between the rollers 28 and 29. This mode of operation makes it possible to produce a hot-stamping film possessing different forms of visual appearance.

I claim:

1. A hot-stamping film comprising a carrier film, a transparent covering lacquer layer having a smooth surface adjacent to the carrier film and being provided on its surface facing away from said carrier film with a spatial pattern, a decorative layer contacting the surface of the transparent covering lacquer layer provided with the spatial pattern, and an adhesive layer, optionally with a separating layer between the carrier film and the covering lacquer layer and optionally with an adhesion-promoter layer between the decorative layer and the adhesive layer.

2. A film according to claim 1, in which the decorative layer is a metal layer of substantially uniform thickness provided between the surface of the transparent covering lacquer layer carrying the spatial pattern, and the adhesive layer, or adhesion-promoter layer if present.

3. A film according to claim 2, in which the metal layer is vapour deposited on said surface.

4. A film according to claim 2, in which the metal layer has a thickness of about 500 Å.

5. A film according to claim 1, in which the decorative layer is a pigmented lacquer layer provided between the surface of the transparent covering lacquer layer carrying the spatial pattern and the adhesive layer, or adhesion-promoter layer is present.

6. A film according to claim 5, in which the pigmented lacquer layer has a thickness of from 2 to 4$\mu$.

7. A film according to claim 1, in which the transparent covering lacquer layer has a thickness of from 1.5 to 3$\mu$.

8. A film according to claim 1, in which the transparent covering lacquer layer is formed by a lacquer which is thermoplastic at least during the application of the spatial pattern.

9. A film according to claim 1, in which the transparent covering lacquer layer is formed by a curable lacquer.

* * * * *